Dec. 16, 1952          R. W. MILES          2,621,627

NEST GUARD

Filed Nov. 28, 1947

INVENTOR.
Russell W. Miles
BY
Bair + Freeman
Attys.

Patented Dec. 16, 1952

2,621,627

UNITED STATES PATENT OFFICE 2,621,627

NEST GUARD

Russell W. Miles, Waverly, Iowa

Application November 28, 1947, Serial No. 788,489

3 Claims. (Cl. 119—45)

This invention relates to guards for hens' nests.

Previously, hens' nests were subject to the objection that eggs were many times cracked or broken in the use of the nests. Hens' nests are usually provided with a solid bottom in which is placed a quantity of bedding or matting, which is usually straw. A hen on entering the nest would usually scratch in the straw until most of it was dislodged from the nest and the hard bottom was exposed. When eggs are laid, they drop on the hard bottom and many times become cracked or broken. This results in obviously inferior eggs. Often times eggs which were not cracked or broken became soiled from those that were broken.

An object of the present invention is the provision of a hen nest and guard which is effective for preventing the hen from dislodging the straw or matting from the nest.

Another object of the invention is the provision of a guard for a hen's nest which prevents the eggs from becoming cracked or broken.

A further object of the invention is the provision of a guard for a hen's nest which is adapted to rest on the straw or matting in the nest and which is sufficiently flexible that it does not detract from the soft matting effect of the straw which is placed in the nest.

A more specific object of the invention is the provision of a guard formed of screen material which rests on the straw or matting in the nest and prevents the hen from dislodging the straw.

A still further object is the provision of a guard as described above which, because it prevents the hen from dislodging the matting in the nest, enables a disinfectant or delousing material to be retained in the nest.

With these and other objects in view, my invention consists in the construction, arrangement, and combination of the various parts of my device whereby the objects contemplated are attained as hereinafter more fully set forth, pointed out in my claims, and illustrated in the accompanying drawing, wherein:

Figure 1:
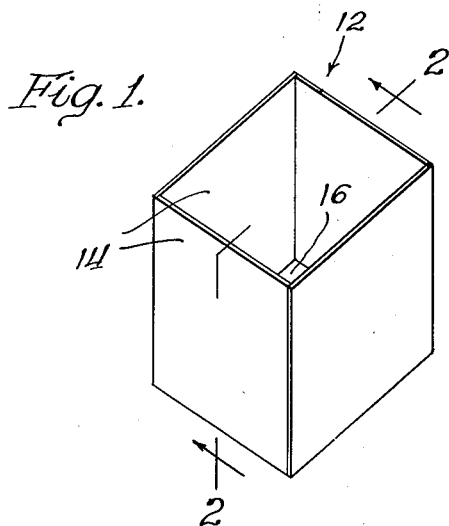
Figure 1 is an isometric view of a nest in which the guard of the present invention is to be employed, the guard being omitted.

Referring now in detail to the drawing, a nest is indicated at 12. The nest 12 may be in the form of an ordinary box and the nests are usually arranged in a group and may also be supported by any convenient supporting structure in elevated position above the floor or ground. The nest 12 has an open top and includes side walls 14 and a bottom 16. Although the nest 12 is illustrated as having an open top, it is obvious that an opening may be provided at any other desired position, for example, on the side in spaced position from the bottom of the nest.

In employing the guard of the present invention, a quantity of bedding or matting material 18 is placed in the bottom of the nest. This bedding is usually straw and that quantity is used which will fill the bottom of the nest to a convenient depth of, for example, four or five inches.

Figure 4:
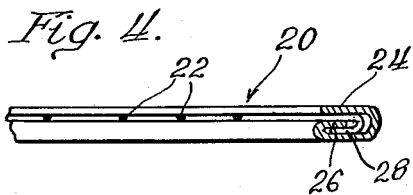
Figure 4 is an enlarged sectional view taken on line 4—4 of Figure 3.

After the straw 18 is thus placed in position, the guard 20 of the present invention is placed in the nest. The guard 20 comprises a wide mesh screen material 22 which is usually in the form of a screen known as chicken wire. This screen is somewhat flexible and is bound by strips 24 around its edges. Figure 4 illustrates in detail one manner of applying the strips 24 to the marginal edges of the screen material 22. The details of construction of the strips 24 are not particularly pertinent. However, the strips 24 may have portions on opposite sides of the screen material and one portion is turned in as indicated at 26 between the screen and a turned over portion 28 of the latter. The sides of the strip 24 are then clinched together. The strips 24 may be of metal and are relatively rigid to retain the body of the screen material 22 in stretched sheet-like form.

Figure 3:
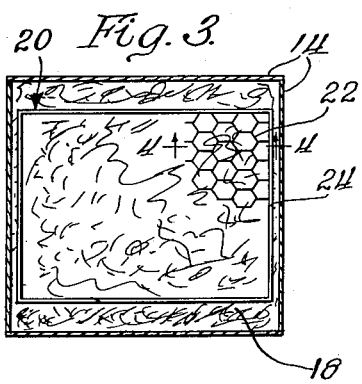
Figure 3 is a sectional view taken on line 3—3 of Figure 2.

As illustrated in Figure 3, the guard 20 is of such a size to substantially cover all of the horizontal cross-sectional area of the nest and, although there are spaces between the sides of the guard and the nest, the difference in dimensions is not intended to be great but only sufficient to provide convenience in inserting the guard in the nest and removing it therefrom.

The guard 20 is, therefore, disposed generally horizontally in the nest and supported by the quantity of matting or straw 18. After the guard is inserted in the nest, another quantity of straw is inserted in the nest as indicated at 30 above the guard 20. The quantity of straw 30 is of a convenient depth similar to the quantity 18, for example, four or five inches.

When a hen enters the nest, she ordinarily and almost always scratches in the straw and pushes it up along the sides of the nest and many times entirely out of the nest. The hard bottom 16 is then exposed and when the eggs are laid they drop onto the hard bottom and often are cracked or broken.

With the use of the nest guard 20 of the present invention, the hen may scratch the straw 30 out of position but after this is done, her claws are retarded by the screen material 22 and the straw 18 is retained in position. The screen material 20 as noted above is flexible and does not detract from the soft matting effect of the straw 18. The rigid strips 24 around the screen material 22 retain the screen in stretched sheet-like form. Since the hen is standing on the screen material 22 with one foot when she scratches with the other, the screen does not move bodily in the nest.

Thus, the quantity of straw 18 under the guard cannot be dislodged by the hen, a soft matting is retained in the nest and the eggs are prevented from becoming cracked or broken.

Another advantage resulting from the nest guard of the present invention is that a disinfectant or delousing material can be more effectively employed. The disinfectant may be applied to the straw 18 and, since this straw cannot be dislodged, the disinfectant remains as applied and effective for the purpose intended.

Figure 2:
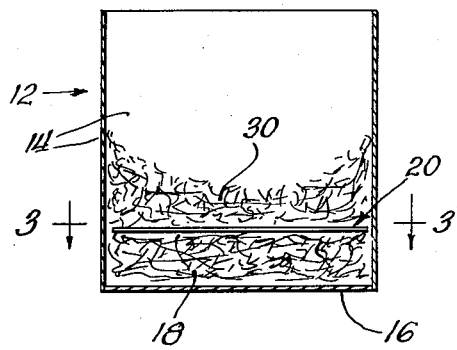
Figure 2 is a sectional view taken on line 2—2 of Figure 1 and illustrating the guard in place.
Figure 5:
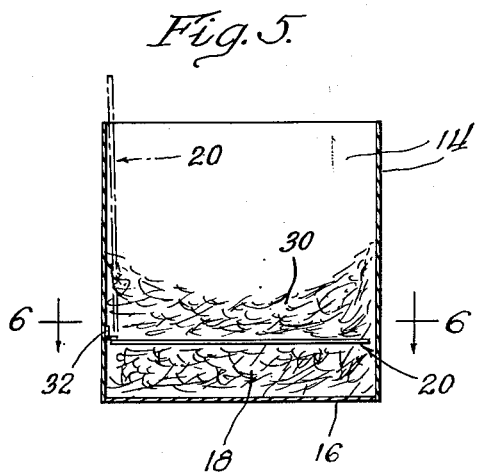
Figure 5 is a sectional view similar to Figure 2, showing a modified form of nest and guard.
Figure 6:
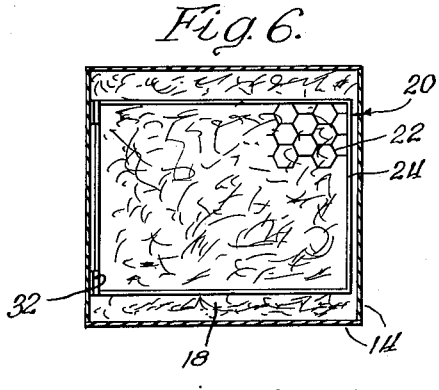
Figure 6 is a sectional view taken on line 6—6 of Figure 5.

Figures 5 and 6 illustrate a modified manner of employing the nest guard 20. In this instance, the guard 20 is provided with hinges 32 which are secured to one of the side walls 16 which is clearly illustrated in Figure 5. The point of securement of the hinge 32 to the nest may be any convenient distance from the bottom of the nest, such as the intended spacing of the guard as illustrated in Figure 2. When the guard is thus hingedly secured to the nest, it can be swung upwardly to the dot-dash line position of Figure 5 for placing the straw 18 in the nest and removing it therefrom. The quantity of straw 18 in this instance is such as to support the guard 20 in horizontal position when the latter is swung down into the nest.

Some changes may be made in the construction and arrangement of the parts of my device without departing from the real spirit and purpose of my invention, and it is my intention to cover by my claims such modified forms of structure or use of mechanical equivalents as may be reasonably included within their scope.

I claim:

1. A hen's nest comprising a box-like container having a bottom and upright sides, a layer of matting on the bottom of said container, a guard immediately adjacent to and supported by said matting, said guard being made of a sheet of flexible screen material and having relatively rigid strips secured to marginal edges thereof, and said guard being hinged adjacent one edge thereof to an upright wall of said container.

2. A hen's nest comprising a box-like container having a bottom and upright sides, a layer of matting on the bottom of said container, a guard adjacent to and supported by said matting, said guard being made of a sheet of flexible screen material and having relatively rigid strips secured to marginal edges thereof, and said guard being hinged adjacent one edge thereof to an upright wall of said container, the thickness of the layer of matting extending from the bottom of the container to substantially the level of said hinge.

3. A hen's nest comprising a box-like container having a bottom and upright sides, a layer of matting on the bottom of said container, a guard adjacent to and supported by said matting, said guard being made of a sheet of flexible screen material and having relatively rigid strips secured to marginal edges thereof, and said guard being hinged adjacent one edge thereof to an upright wall of said container, and an additional layer of matting covering the guard.

RUSSELL W. MILES.

REFERENCES CITED

The following references are of record in the file of this patent:

UNITED STATES PATENTS

| Number | Name | Date |
|---|---|---|
| 492,046 | McKnight | Feb. 21, 1893 |
| 1,123,300 | Irwin | Jan. 5, 1915 |
| 1,216,766 | Andrews | Feb. 20, 1917 |
| 1,288,325 | Weldon | Dec. 17, 1918 |
| 1,329,024 | Scott | Jan. 27, 1920 |
| 1,329,963 | Faust | Feb. 3, 1920 |
| 1,692,957 | Skinner | Nov. 27, 1928 |
| 1,728,700 | Purdy | Sept. 17, 1929 |
| 1,740,323 | Waller | Dec. 17, 1929 |

FOREIGN PATENTS

| Number | Country | Date |
|---|---|---|
| 725,937 | France | May 19, 1932 |
| 63,135 | Denmark | Jan. 15, 1945 |